May 28, 1963 G. DEMMEL 3,091,074
APPARATUS FOR PRODUCING COMMUNICATION CABLES
Filed Dec. 28, 1961 2 Sheets-Sheet 1

Inventor:
Georg Demmel

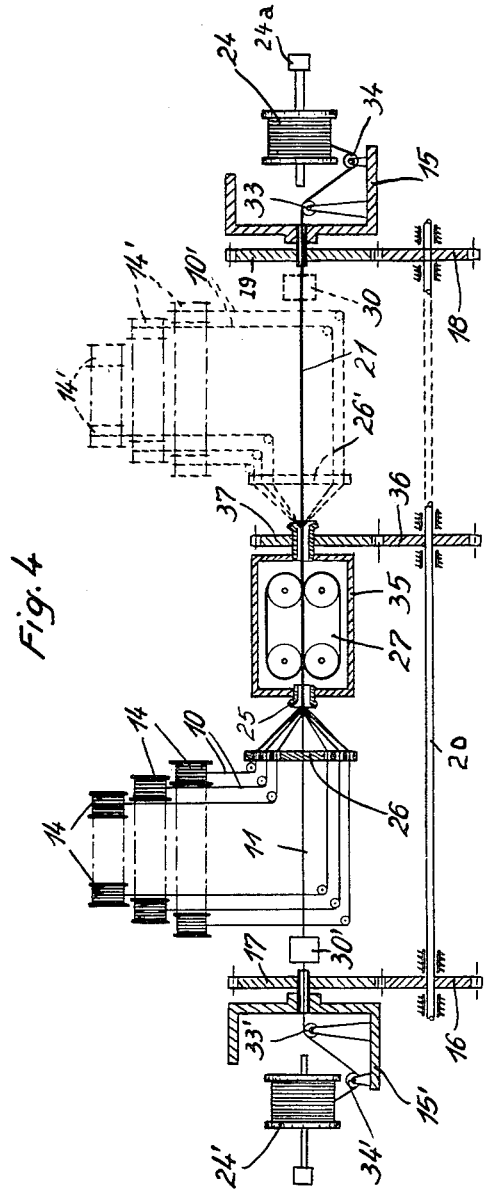

United States Patent Office 3,091,074
Patented May 28, 1963

3,091,074
APPARATUS FOR PRODUCING COMMUNI-
CATION CABLES
Georg Demmel, Berlin-Siemensstadt, Germany, assignor
to Siemens-Schuckertwerke Aktiengesellschaft Berlin-
Siemensstadt, Germany, a corporation of Germany
Filed Dec. 28, 1961, Ser. No. 162,888
Claims priority, application Germany Dec. 30, 1960
2 Claims. (Cl. 57—12)

My invention relates to producing electric communication cables by winding cable elements in layers about a central core.

The conventional technique of making such cables is to journal the supply drums for the cable elements, such as individual wires, wire pairs, quads or other groups of conductors, in a rotating creel cage or flyer and to rotate a basket to thereby twist the elements, as they are being pulled off the respective drums by means of a stationarily mounted pull device, about the central cable core which may comprise one or more previously cabled layers. If a plurality of element layers are to be roped upon each other in this manner, a machine with a corresponding plurality of rotating creel cages can be used to produce all or several of the layers in a single manufacturing operation.

This conventional layer-cabling method does not afford the production of very great continuous lengths of cables. The size of the manufacturing lengths is mainly limited by the length of the cable elements that can be accommodated on the respective supply drums. The drums cannot be enlarged at will because this would entail an undesirable increase in rotating mass of the flyer and thus appreciably reduce the manufacturing speed. If a cabling layer comprises cable elements of different types, for example shielded pairs of radio wires as well as unshielded wire groups, the attainable manufacturing length is determined by the length of the thickest or heaviest cable element that can be accommodated on a supply drum, for example by the length of the shielded radio-wire pair.

There are various known departures from the above-mentioned conventional layer-cabling method. For example, the cabling of elements into element groups, as well as the cabling of the element groups into a layer, can be perfomed within a single fabricating operation. In order to then obviate the necessity of turning the group-cabling machine about the layer-cabling axis and also obviate turning the bearing structure of the pull-off pulley, it is proposed in German Patent 631,929 to pass the element groups through a reciprocating cabling disc and to wind the group into a cabled layer with a periodically alternating direction of winding pitch. This method, in principle, would afford producing increased manufacturing lengths but involves the disadvantage of the alternating pitch direction. According to German Patent 645,729, the method of cabling the elements into groups and simultaneously cabling the groups into a layer in one and the same operation, can also be utilized for obtaining during cable manufacture and on the basis of electrical measurements, a compensation of coupling effects and ground capacitances in the element groups. The cabling of the groups into a layer can then be effected either with a fixed or with a rotating journal structure for the pull-off sheave. However, the cabling of elements into groups and the simultaneous cabling of the groups into a layer while maintaining the same layer-pitch direction involves an extremely difficult manufacture and has not found application in practice, aside from the fact that this method is not suitable for providing particularly long manufacturing lengths of cable.

My invention relates to the cabling of communication cable elements, such as individual conductors, pairs, quads, wire bunches and bunch groups, to form a layer about an internal cable core which may comprise one or more previously cabled layers, and pursues the objects to afford the production of longer manufacturing lengths and to satisfactorily permit operating at a greater manufacturing speed than heretofore economically attainable.

To this end, and in accordance with a feature of my invention, the cable elements are pulled off supplies located at stationary locations rather than on a rotating creel cage or flyer, while the elements are being roped or cabled about the cable core, and the core, while coming from the core supply, is being turned or twisted about the cabling axis in the same manner as the resulting, completely cabled strand so that the pitch lengths of the core are not changed.

According to another feature of my invention, the cabling elements, as they run off the respective supplies, are individually given a reverse twist.

According to a further feature of my invention, a cabling apparatus for performing the method of the invention is provided at one end with a device for accommodating the cable-core supply, at the other end with a device for rotating the cable strand about the cabling axis, and is further provided with transmission means for causing the two devices to rotate about the cabling axis in synchronism with each other while the cable elements are being pulled off their respective supply drums and wound into a layer about the core.

The respective supplies of cabling elements are disposed at stationary locations and comprise the elements either wound upon drums or placed into buckets or barrels. Due to such stationary mounting, the supplies may comprise any desired great lengths of elements even if relatively thick and heavy cable elements, such as coaxial lines, are involved. When the cable elements are thin and light in weight, such as individual wires, then manufacturing lengths of cable amounting up to several kilometers can be produced without difficulty, this being infeasible with the conventional cabling method.

It is preferable to accommodate the cable core member on a supply drum which is inserted, for example at the starting end of the cabling apparatus, into a yoke or bail member rotatable about the cabling axis in order to produce the necessary twist of the core member. The rotation or twist of the cabled strand (namely the core member with the layer of cable elements wound thereupon) can be effected by means of rotatable single or double bails, or by means of a rotatable yoke containing the take-up drum. Depending upon the machine design, it may also be necessary to rotate the carrier of the pull-off device, such as a pull sheave or caterpillar-type pull device, together with the rotatable bail, yoke or other flyer, about the cabling axis.

The method of my invention can be performed in such a manner that the layers are cabled selectively or sequentially in one and the other travel direction of the cable being formed. For this purpose, each of the two devices for turning the cable-core supply and for turning the cabled strand respectively is given such a design that it is suitable for paying-out as well as pulling-in operation of the drum journalled on the device. In this case, the two just-mentioned terminal devices of the cable forming apparatus preferably have similar or the same design and size. With such an apparatus the cabling is effected alternately in one and the other axial travel direction of the cable.

It is preferable in this case to give the stationary area for assembling the storage containers or supply drums of the elements to be cabled (for example cable conductors or pairs) such a large size that, during cabling of a layer in one direction, the supplies of the elements for the next layer, to be cabled in the other direction, can already be set up. In this manner, a plural-layer cable can be produced successively with only short stopping periods of the cabling machine because after completion of each individual layer the take-up drums need not be exchanged.

In a cabling apparatus operating as just described, each of the two terminal devices affords issuing and twisting of the cable core as well as twisting and winding-up of the cabled strand. It is preferable to provide only one pull device between the two terminal devices to alternately operate in one or the other pulling direction, the two terminal devices and the pull device being synchronously driven to rotate about the cabling axis while a layer of elements is being placed upon the cable structure.

The foregoing and more specific features of my invention will be apparent from, and will be mentioned in, the following description of embodiments of cabling apparatus according to the invention, illustrated by way of example on the accompanying drawings in which:

FIG. 4 is a schematic and sectional view of an apparatus suitable for the production of element layers in both travel directions of the cable structure.

Figure 1:
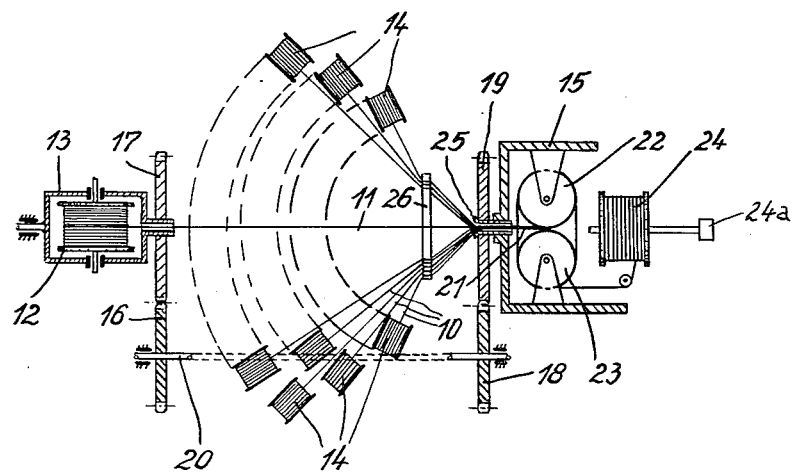
FIG. 1 is a schematic, sectional view of a cable forming apparatus.

According to FIG. 1 a large number of individual cable elements 10 are to be roped about a cable core 11 to form a helical layer thereon. The core 11 may already comprise an inner cabled layer of elements. The material for core 11 is accommodated on a storage or supply drum 12 which is rotatably inserted into a yoke 13. The yoke 13 is rotatable about a stationary axis extending at a right angle to the journal axis of the drum 12.

The cable elements 10 to be wound in a layer about the core 11 are accommodated on respective supply drums 14 which are rotatably journalled at stationary locations. From drums 14 the individual elements 10 pass through respective bores in a stationary distributor disc 26 from which they pass through a twisting nipple 25 onto the cable core 11. The disc 26 provides for uniform distribution of the cable elements about the periphery of the core. The nipple 25 is coaxially fastened in a rotatable flyer basket 15 on which two pull discs 22, 23 are rotatably mounted. During rotation of the basket 15 about the cable axis, the strand structure formed by the core 11 and the helical layer of elements 10 placed thereupon passes between and about the pull discs 22, 23 to run onto a take-up drum 24 which is journalled at a stationary location. The yoke 13 and the flyer basket 15 are rotated by respective spur gear transmissions 16, 17 and 18, 19. The spur gears 16 and 18 are mounted on a common shaft 20, and both transmissions have the same transmission ratio so that the yoke 13 and the basket 15 rotate in synchronism with each other.

In the embodiment described above, the shaft 20 may be driven by a suitable electric motor (not shown), and another electric motor is preferably mounted on the flyer basket 15 for driving the pull discs 22, 23. The take-up drum 24 is driven by an auxiliary motor 24a at the speed required for the drum 24 to receive the completed cable structure at the speed with which it issues from the pull-off sheaves 22, 23.

Figure 2:
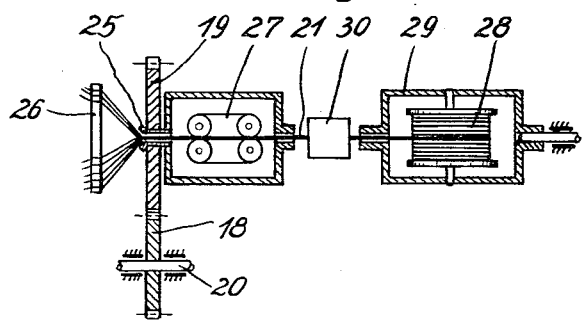
FIG. 2 shows schematically and in section a modified portion of an apparatus otherwise corresponding to FIG. 1.

FIG. 2 illustrates only the right-hand portion of a cabling apparatus otherwise as shown in FIG. 1. In the embodiment of FIG. 2 a rotating caterpillar device 27 is employed for pulling the cable structure through the apparatus, and the take-up drum for receiving the completely cabled strand 21 is journalled in a yoke 29 that synchronously rotates together with the supply-drum yoke 13 (FIG. 1) and together with the flyer basket containing the caterpillar pulling device 27. A spinning device 30 is mounted between the pull-off device 27 and the yoke 29 and serves to wind one or more threads, strings or tapes about the cabled strand before it passes onto the take-up drum 28. In the embodiment of FIG. 2 the yoke 29 is operatively connected with the basket structure that contains the pulling device 27, or forms part of such basket, and an auxiliary motor for driving the drum 28 may be mounted on the yoke 29.

Figure 3:
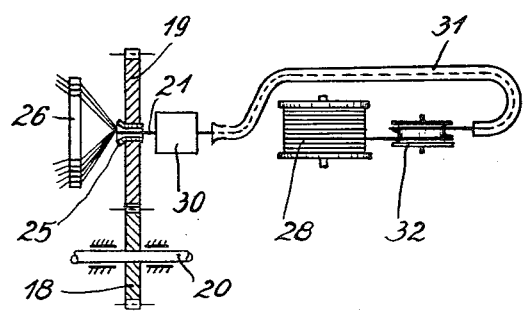
FIG. 3 shows schematically and in section another modification of an apparatus otherwise according to FIG. 1.

While in the above-described embodiments of FIGS. 1 and 2 the twisting flyer is of the single-bail type, the modified embodiment according to FIG. 3 is provided with a double bail 31. The pull-off is effected by means of a pulling sheave 32 journalled at a stationary location. The yoke 13 for the core supply (FIG. 1) is driven to rotate at twice the rotating speed of the twin bail 31 about the cabling axis. The cabled strand 21 is wound upon the take-up drum 28 journalled in stationary bearings. In this embodiment, a double roping of the cabling elements into a layer is obtained due to employment of the twin bail. The means for maintaining the mounting of take-up spool 28 and pull sheave 32 stationary, although the bail 31 rotates about drum and sheave, are not illustrated because they need not differ from those known from U.S. Patent 2,956,391, FIGS. 4 to 7.

The embodiments described can be modified in various respects. For example, in the apparatus according to FIG. 1, the pull sheaves 22, 23 may be substituted by a caterpillar-type device as shown at 27 in FIG. 2. Furthermore, the pull device, such as pulling sheaves or a caterpillar device, can be accommodated in a yoke separate from the twisting flyer proper, and a spinning device, such as shown at 30 in FIG. 2 or 3, may be used between the pull device and the flyer. In the embodiment of FIG. 2, the caterpillar device 27 can be substituted by a pull sheave, or the pull device can be built into the yoke 29 for accommodating the take-up spool 28.

The cabling apparatus shown in FIG. 4 affords a production of element layers in both axial travel directions of the cable structure being produced. Such apparatus are particularly favorable as to economy and efficiency of manufacturing performance. The apparatus shown in FIG. 4 is provided with two single-bail type flyers 15 and 15' and with respective cable drums 24 and 24', corresponding essentially to device 15 and drum 24 in FIG. 1. However each terminal device 15, 24 and 15', 24' affords twisting and paying-out of the cable core 11 as well as twisting and winding-up of the cabled strand. Guide rollers 33, 34 and 33', 34' on each flyer 15, 15' serve for guiding the cable core and the cabled strand onto the drum 24 or 24'. A single pulling device is provided consisting of a caterpillar assembly 27 mounted in a rotating yoke 35.

The flyers 15 and 15' are interconnected by respective spur-gear transmissions 17, 16 and 18, 19. The gears 16 and 18 are mounted on an interconnecting shaft 20 to secure synchronism in the rotation of both flyers. For synchronous rotation of the pull device 27, the yoke 35 is coupled with the same shaft 20 by a third spur-gear transmission 36, 37 having the same transmission ratio as each of the transmissions 16, 17 and 18, 19.

Two groups of supply drums 14 and 14' for the cable elements 10 and 10' are arranged in separate areas of the manufacturing plant and, as explained with reference to FIG. 1, are individually journalled at stationary locations. In the one group active at a time, the cable element 10 or 10' from each drum 14 or 14' passes through one of a number of openings in a distributor disc 26 or 26' through a twisting nipple 25 onto the cable core.

The apparatus operates as follows. First, the cable elements 10, for example, are pulled by means of the device 27 from the supply drums 14 through the distributor disc 26 and are wound onto the cable core 11 as they pass through the twisting nipple while the cable core is being supplied from the drum 24' over the guide rollers 34', 33', and the flyers 15', 15 and the yoke 35 of the pull device are rotating in the same sense and at the same speed. The cabled structure then passes through a spinning device 30' where it is covered with textile threads before it enters into the flyer basket 15 where it passes over the guide rollers 33 and 34 which place it upon the drum 24. During this operation the twisting of the core 11 and of the cabled strand 21 is effected by the synchronous rotation of the single-bail flyers 15 and 15'.

During the cabling operation just described, the supply drums 14' with the cable elements 10' are prepared and set up for the production of the next layer. When the cabling of the preceding layer is completed and the cabled strand 21 completely wound upon the drum 24, the production of the next layer can commence. For this purpose, the travel direction of the strand is reversed so that it now passes from the drum 24 through the twisting nipples of the apparatus to the drum 24'. Now the cable elements 10' pulled off the supply drums 14' are cabled about the revolving strand.

In this manner, any desired number of layers can be produced in alternating pull-through directions almost without interruption of the cabling operation. By means of the spinning devices 30 and 30', each cabled layer can be covered by winding threads, tape or other material about the layer before winding the next layer thereupon. If desired, the single-bail flyers 15 and 15' can be substituted by rotating yokes with an inserted take-up drum or by double bails with a take-up drum located, according to FIG. 3, in the area covered by the rotating bail. The necessary synchronous rotation of the two flyers 15 and 15' with the yoke 35 can also be obtained by means of electric synchro-systems and the like synchronizing means well known for such purposes.

Such and other variations and modifications will be obvious to those skilled in the art, upon a study of this disclosure, and are indicative of the fact that the invention can be given embodiments other than particularly illustrated and described herein, without departing from the essential features of my invention and within the scope of the claims annexed hereto.

I claim:

1. Apparatus for producing electric communication cables by cabling individual cable elements about a core, comprising two terminal devices coaxially spaced from each other and each having a structure rotatable about the common axis, two drums journalled on said respective two structures for selective pay-out and pull-in operation, each drum being capable of accommodating either a supply of core or the cabled strand comprised of core and cable element layer, depending upon the rotary direction of said drums; a multiplicity of stationarily arranged cable element supply means, twisting means for passing respective elements from said cable element supply means onto said core as the latter passes from one drum to said other drum, a third structure rotatable about said axis and a reversible cable pull device mounted thereon, cable element guiding means located on each side of said cable pull device for guiding cable elements adapted to surround said core from said cable element supply means into each end of said reversible cable pull device, and synchronous drive means connected with said three structures for simultaneously rotating them during the cabling operation about said axis, all three structures having the same sense of rotation, whereby the apparatus affords producing sequential layers of cable elements in sequential cabling passes with alternately reversed travel directions of the core.

2. Cabling apparatus according to claim 1, said cable element supply means forming two groups each comprising a number of supplies sufficient to form a complete layer, said two groups being located in axially spaced, stationary areas along said axis between said two terminal devices for alternate operation, one group at a time, depending upon the core travel direction; said twisting means having two twisting nipples rotatable together with said third structure for coaction of each nipple with one of said respective two groups; and said third structure and pull device being mounted axially between said two areas.

References Cited in the file of this patent

UNITED STATES PATENTS

| 1,100,538 | Cooper | June 16, 1914 |
| 1,911,925 | Reed | May 30, 1933 |
| 2,763,979 | Swanson | Sept. 25, 1956 |

FOREIGN PATENTS

| 1,072,160 | Germany | Dec. 24, 1959 |
| 847,897 | Great Britain | Sept. 14, 1960 |